Nov. 6, 1928.

H. E. HOWARD

BELT CONVEYER

Filed June 24, 1925

1,690,301

Inventor
Hermon E. Howard
By Fred Gerlach
his Atty.

Patented Nov. 6, 1928.

1,690,301

UNITED STATES PATENT OFFICE.

HERMON E. HOWARD, OF CHICAGO, ILLINOIS, ASSIGNOR TO WELLER MANUFACTURING COMPANY, OF CHICAGO, ILLINOIS, A CORPORATION OF ILLINOIS.

BELT CONVEYER.

Application filed June 24, 1925. Serial No. 39,192.

The invention relates to pulleys for belt conveyers and supports therefor.

One object of the invention is to provide an improved construction, in which a troughing roll, which is provided with a closed upper or outer end, is provided with means for delivering lubricant to the inner end of the shaft for said roll, so that the structure may be lubricated while the wheel is in operation. Other objects of the invention will appear from the detail description.

The invention consists in the several novel features hereinafter set forth and more particularly defined by claims at the conclusion hereof.

Figure 1:
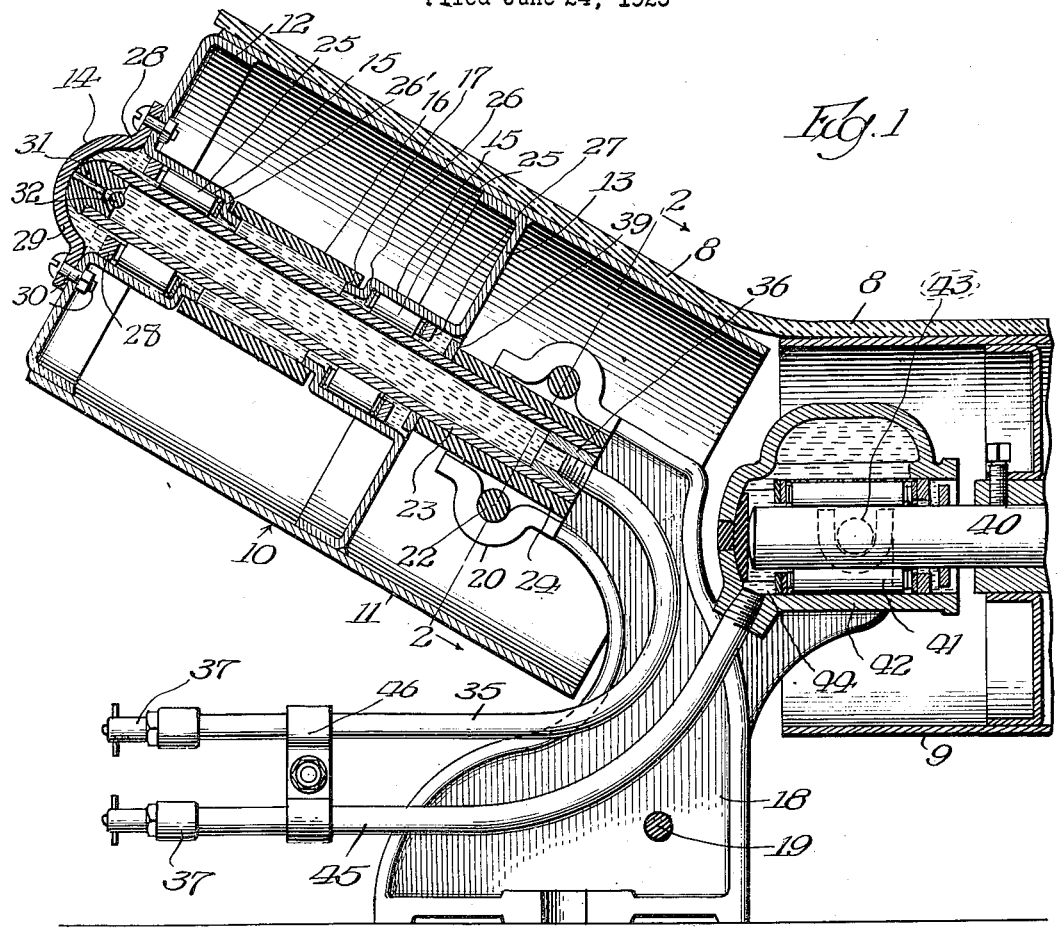
Figure 2:
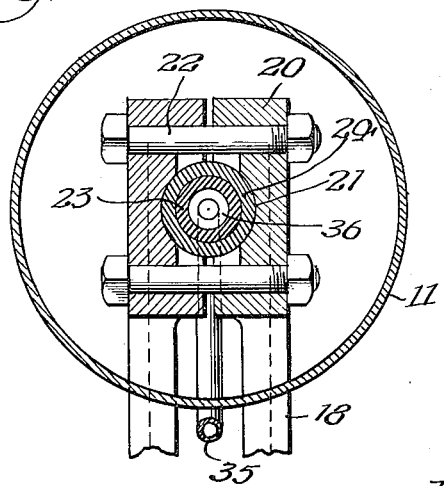
Figure 3:
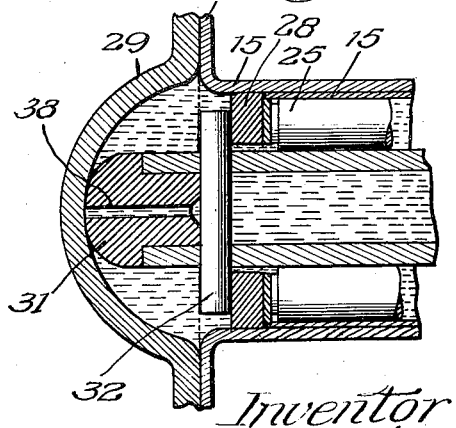

In the drawings: Fig. 1 is a vertical axial section of a troughing roll embodying the invention. Fig. 2 is a section on line 2—2 of Fig. 1. Fig. 3 is a section through the outer end of the pulley and its shaft, showing the abutment pin for preventing outward displacement of the pulley.

The invention is exemplified in a structure comprising an endless belt 8, only the upper reach of which is shown. This portion of the belt is carried by a pulley 9, which supports the central portion of the belt and inclined troughing roll 10. The troughing roll comprises a sheet metal rim 11, an outer flanged head 12 and an inner flanged head 13, both of which are fixedly secured by any suitable means, such as pressing or welding, into the rim. Each of said heads is provided with an integral hub 15 which extend toward each other, and a sleeve 16 extends between said hubs, the hubs and sleeves constituting a continuous enclosure between the heads. The sleeve 16 is pressed onto reduced portions 17 of the hubs 15. These heads are preferably formed of sheet metal.

The supporting structure for the troughing roll comprises a bracket formed of sections 18 which are secured together by a bolt 19, and are provided with complementary jaws 20, which are provided with complementary cylindrical recesses 21, and are adapted to be clamped by bolts 22 to fixedly secure the troughing roll shaft in its desired inclined position. Said shaft comprises a hollow member 23 and a sleeve 24 fixedly secured thereon, and which fits in the cylindrical seats 21 and is adapted to be gripped by the clamping members 20. The hollow shaft 23 extends upwardly and outwardly through the hub 15 and sleeves 16. Roller bearings 25 are interposed between the hubs and the shaft. The shoulder 26 in the inner hub 15 confines the inner set of rollers against outward movement and a ring 27 pressed into the hub confines them against inward movement in the hub. A similar shoulder 26' in the outer holder 15 confines the outer set of rollers against inward movement in the hub, and a ring 28, pressed into the outer end of the outer hub confines said rollers against outward movement.

An outwardly bulged cap 29, fixed by bolts 30 to the outer head 12, encloses the space within the hub of said shaft and is adapted to bear against a plug 31 secured in the outer end of shaft 23, so that the plug and said cap will serve as thrust means for confining the pulley against inward downward movement. A pin 32 extends through the hollow shaft 23 adjacent its outer end and serves as a thrust member adapted to coact with the ring 28 to confine the pulley against outward displacement on the shaft.

A pipe 35 is connected to a bushing 36 which is fixed in the inner end of hollow shaft 23 to deliver the lubricant into the chamber in said shaft. This pipe is curved downwardly and outwardly from the bushing 36 and extends thence outwardly, so its outer end, which is provided with a suitable device 37, is adapted to be connected to a grease gun, so that lubricant may be forced through the pipe into the hollow shaft. The plug 31 is provided with a duct 38, leading outwardly from the chamber in the hollow shaft, through which lubricant will be fed into the cap 29. This lubricant will keep the bearing surface between the plug and the cap lubricated. and will also pass downwardly on the outside of the hollow shaft to lubricate both roller bearings, the sleeve 16 permitting the lubricant to pass from the outer set of rollers to the inner set. A ring 39 is pressed onto the hollow shaft 23 adjacent the bearing retaining ring 27, to form a seal for the lubricant.

The supporting roll 9 is fixed to a shaft 40, which is journalled in a roller bearing 41 in a bearing box 42, which is provided with trunnions 43 to pivotally support said box in lugs 44 projecting inwardly from the brackets 18. A pipe 45 is connected to deliver lubricant into said box and provided at its outer end with a fitting 37 for connection to a grease pipe. Pipes 35 and 45 are secured together for mutual support by a clamp 46.

The invention exemplifies a troughing roll which is supported by a hollow stationary shaft, through which lubricant is supplied to the pulley. The connection for supplying lubricant being stationary, adapts the device for refilling the pulley with lubricant while it is in operation, should that be desired. The outer end of the pulley is closed to exclude dust, and the lubricant works its way from the outer end of the shaft downwardly through and around the roller bearings for the pulley.

The roll may be removed from the shaft by removing the screws 30 and cap 29. When the cap is removed, the thrust pin 32 will be accessible so it can be removed, whereupon the pulley will be free to be withdrawn longitudinally from the outer end of the shaft. In mounting the pulley on the shaft, the pin 32 will be inserted into the shaft after the pulley has been placed thereon, and when the cap 29 is secured in place, the shaft and bearing surface will be completely enclosed for the retention of lubricant.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a support for a conveyer belt, the combination of a bracket, an inclined hollow shaft having its inner end fixedly secured in the bracket, a troughing roll comprising a rim, a head at the outer end of the rim having an opening therein through which the shaft may pass, a head adjacent the inner end of the rim and a hub between the heads, a cap removably secured to the outer head and forming a closure for said opening, the outer end of the shaft and the cap being provided with abutting surfaces to limit the inward movement of the roll, means adjacent the outer end of the shaft for holding the roll against outward movement, and means for delivering lubricant to the inner end of the shaft and from the shaft to the bearing surfaces between the hub and the shaft.

2. In a support for a conveyer belt, the combination of a bracket, an inclined shaft having its end fixedly secured in the bracket and a plug secured in its outer end, a troughing roll comprising a rim, a head at the outer end of the rim having an opening therein through which the shaft may be inserted, a head adjacent the inner end of the rim and a hub between the heads, a cap removably secured to the outer head and forming a closure for the opening, the cap and said plug engaging each other to limit the inward movement of the roll, means adjacent the outer end of the shaft for holding the roll against outward movement, and means for delivering lubricant between the hub and the shaft.

3. In a support for a conveyer belt, the combination of a bracket, an inclined shaft having its end fixedly secured in the bracket and a plug secured in its outer end, a troughing roll comprising a rim, a head at the outer end of the rim having an opening therein through which the shaft may be inserted, a head adjacent the inner end of the rim and a hub between the heads, a cap removably secured to the outer head and forming a closure for the opening, the cap and said plug engaging each other to limit the inward movement of the roll, a pin carried by the shaft adjacent its outer end, an abutment on the hub engaged by the pin to hold the roll against outward movement, and means for delivering lubricant between the hub and the shaft.

4. In a support for a conveyer belt, the combination of a supporting bracket, a hollow shaft having its inner end fixedly secured in the bracket, a troughing roll journaled on said shaft, the roll being provided with a head adjacent the outer end of the shaft, a cap removably secured to the head for enclosing the outer end of the shaft, a plug in the outer end of the shaft for resisting inward thrust, removable means on the shaft for resisting outward thrust, accessible when the cap is removed, and means for delivering lubricant to the inner end of the shaft, the plug having a duct for delivering lubricant from the outer end of the shaft to the cap.

5. In a support for a conveyer belt, the combination of a supporting bracket, a hollow shaft having its inner end fixedly secured in the bracket, a troughing roll comprising a rim, inner and outer heads fixed therein, the heads being provided with hubs and a sleeve extending between the hubs, roller bearings between the hubs and the shaft, means in the hubs also for confining the bearings longitudinally, a cap for enclosing the outer end of the shaft, removably secured to the outer head, a plug for resisting inward thrust of the roll, and having an opening therethrough, a removable pin in the outer end of the shaft for resisting outward thrust, and means for delivering lubricant to the inner end of the shaft, the plug having a duct therein, through which lubricant will pass.

Signed at Chicago, Illinois, this 21st day of May, 1925.

HERMON E. HOWARD.